Nov. 5, 1968   F. S. DADDS   3,409,336
SEALED TRACK JOINT FOR CRAWLER VEHICLES
Filed Dec. 21, 1966   2 Sheets-Sheet 1
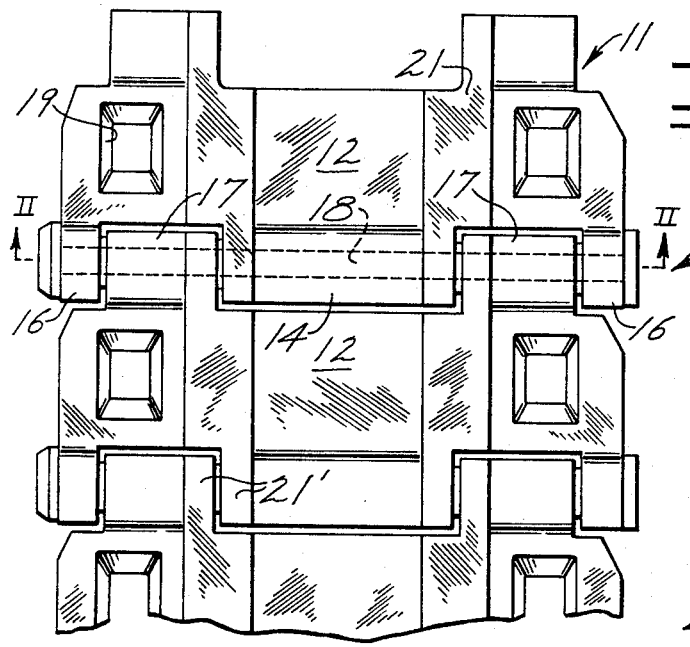
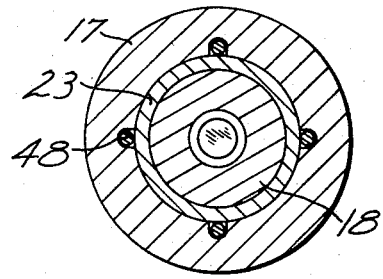
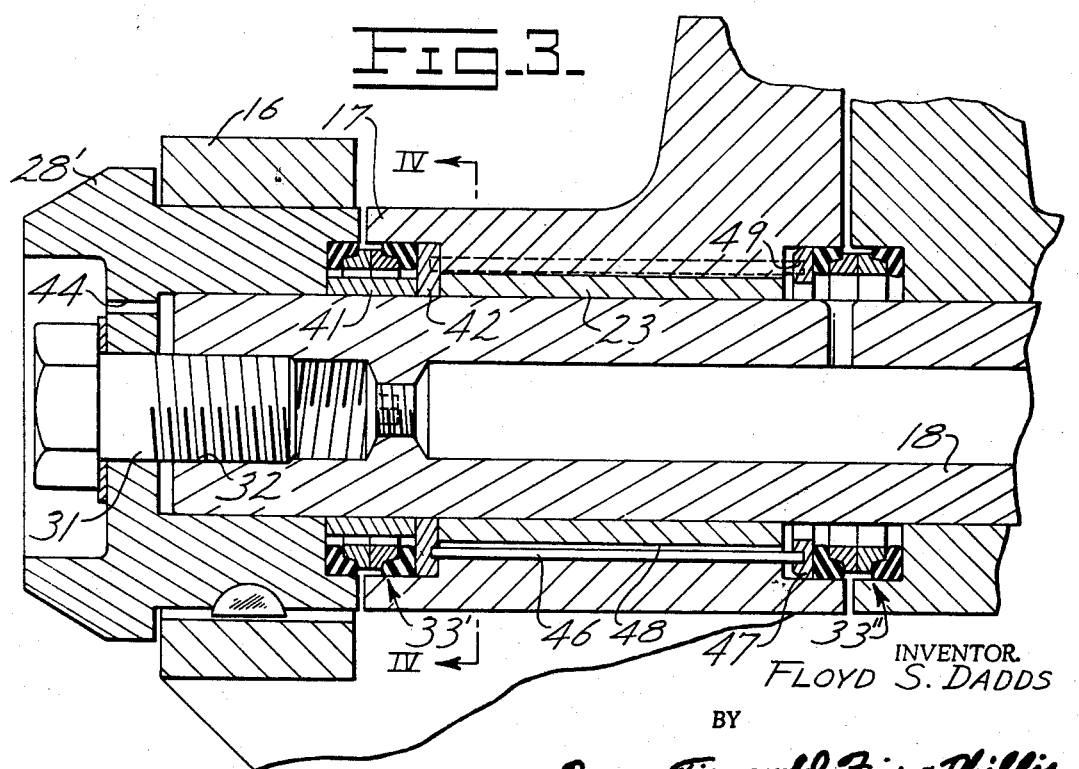
INVENTOR.
FLOYD S. DADDS
BY
Fryer, Tjensvold, Feix & Phillips
ATTORNEYS Nov. 5, 1968   F. S. DADDS   3,409,336
SEALED TRACK JOINT FOR CRAWLER VEHICLES
Filed Dec. 21, 1966   2 Sheets-Sheet 2
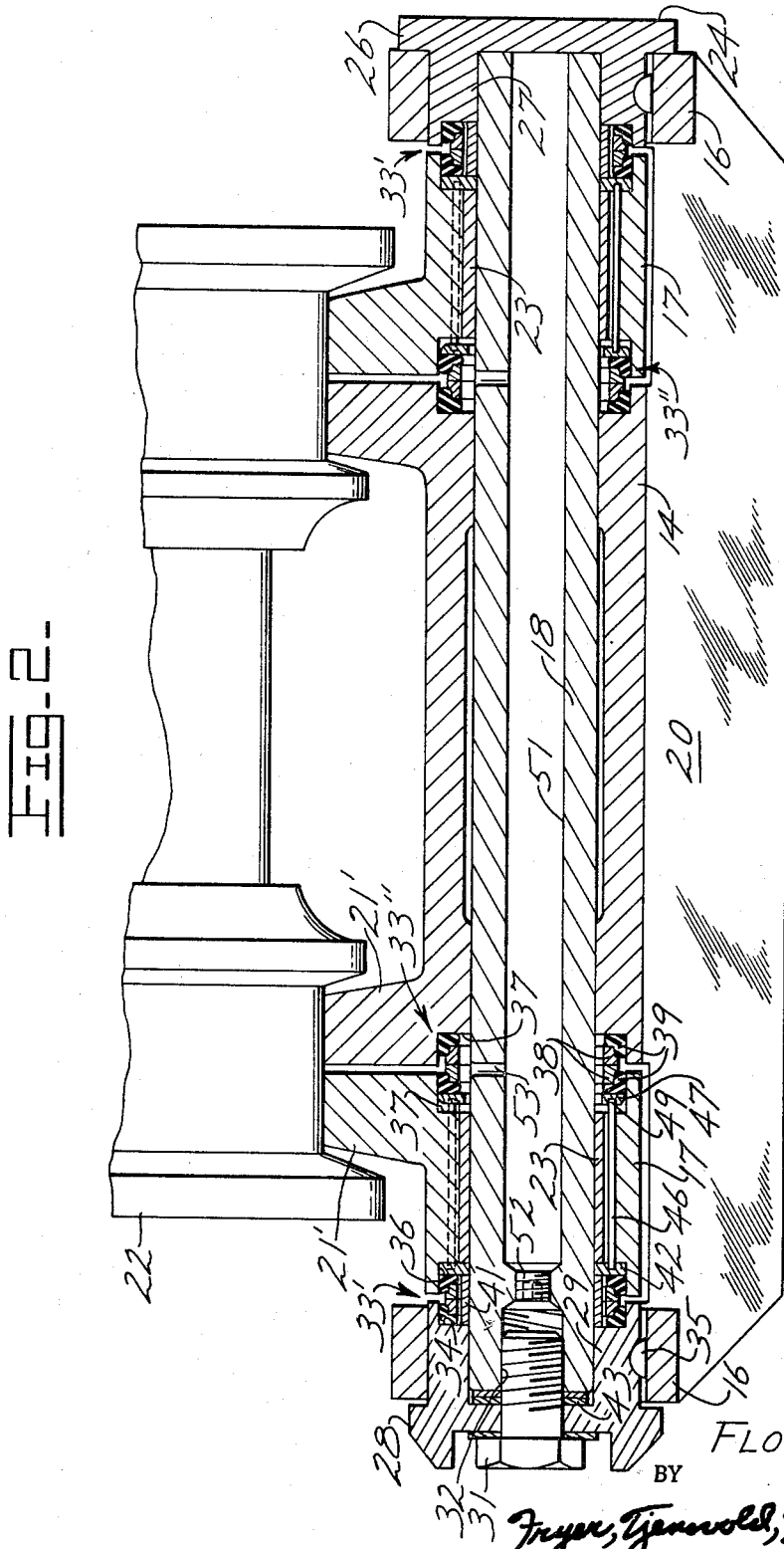
INVENTOR.
FLOYD S. DADDS
BY
Fryer, Tjensvold, Feix + Phillips
ATTORNEYS

3,409,336
SEALED TRACK JOINT FOR CRAWLER VEHICLES

Floyd S. Dadds, Peoria, Ill., assignor to Caterpillar Tractor Co., Peoria, Ill., a corporation of California
Filed Dec. 21, 1966, Ser. No. 603,578
9 Claims. (Cl. 305—11)

This invention relates to articulated track chains for crawler vehicles and more particularly to a sealed joint construction, for coupling component members of the track, having means providing an optimum loading force on internal seals which are inaccessible to conventional seal loading elements.

Tracks of the type used on military vehicles, crawler tractors, and the like are more durable and function more efficiently if seals are utilized at the joints between the component links of the track to retain lubricant and to exclude abrasive foreign material. Several axially spaced annular seals are usually needed at each joint. For satisfactory operation, a specific axial loading force must be applied to each seal during assembly of the track chain and the loading force should be maintained constant during operation.

Adequate seal loading is readily accomplished in many types of track chain inasmuch as all of the seals at each joint are located at a position at which a loading element can readily be caused to bear against each seal. However some track chain constructions, with preferred characteristics for specialized applications, require that some of the seals be situated at a relatively inaccessible enclosed location such as in between others of the seals. Conventional loading techniques cannot readily be applied to such seals.

An advantageous form of track for military vehicles, for example, has a pair of bearings at each joint which are enclosed by hinge members on the two adjacent links of the track. An annular seal is required at each side of each bearing. Loading may readily be applied to the outermost two seals by a threaded element or the like at the end of the joint; however the two innermost seals are enclosed by the hinge members and located between the outer seals. Similar situations are encountered in still other types of track joints.

The present invention provides for establishing and maintaining an optimum loading on a series of seals in a track joint where one or more of the innermost seals are not readily accessible to conventional means for exerting a pre-determined axial force thereon. In particular, a threaded end cap on the track pin, or the like, is utilized to load the outermost seals and a series of thrust transmitting pins extend axially within the joint, from the outer seals to the enclosed inner seals to transmit the loading force thereto.

Accordingly it is an object of this invention to provide a sealed joint construction for coupling component members of a vehicle track chain in which the loading of enclosed internal seals is readily effected during assembly and readily maintained in operation.

It is another object of the invention to provide a more durable, efficient and economically manufactured track chain joint in which internal seals are enclosed by track components and situated between other seals.

It is still another object of this invention to simplify assembly and improve operation of vehicular track chains of the class having relatively inaccessible internal seals.

The invention, together with further objects and advantages thereof, will best be understood by reference to the following specification taken in conjunction with the accompanying drawings of which:

FIGURE 1 is a plan view of a portion of vehicle track embodying the invention;

FIGURE 2 is a cross section view taken along line II—II of FIGURE 1 and showing the internal construction of a joint between adjacent component members of the track of FIGURE 1;

FIGURE 3 is a section view of a portion of the track chain joint of FIGURE 2 showing a specialized temporary element thereof used to facilitate assembly; and FIGURE 4 is a section view taken along line IV—IV of FIGURE 3 further showing the arrangement of seal loading force transmitting means employed in the track chain joint.

Referring now to the drawing and more particularly to FIGURE 1 thereof, there is shown a section of vehicle track chain 11 of the type particularly adapted for military vehicles such as tanks, armored personnel carriers, and the like which may travel at high speeds. The track is formed by a series of composite shoe links 12 connected together in a pivotable manner by hinge joints 13. To form each of the joints 13, one end of each shoe link 12 has a central hinge member portion 14 and side hinge member portions 16 which are of less thickness and which are spaced therefrom to provide recesses into which a pair of hinge member portions 17 at the adjacent end of the the next shoe link 12 extend. A transverse track pin 18 extends through the interleaved hinge members 14, 16 and 17 of the two shoe links 12 to couple the members together in a pivotable manner. As shown in FIGURE 2, transverse grousers 20 are provided along the underside of the shoe links 12 for improved traction.

Referring again to FIGURE 1, each shoe link 12 has a rectangular opening 19 at each side to provide for engagement of the track 11 by sprocket gears. Spaced apart, raised, parallel link portions 21 are provided along the top of each shoe link 12 to engage conventional track rollers 22 as shown in FIGURE 2. In the region of the joints 13 each such link portion 21′ is of reduced thickness so that the link portions of adjacent shoe links 12 overlap while maintaining a uniform thickness for the link portion structure as a whole. By forming the several hinge members 14, 16 and 17, grousers, 20, and links 21, as integral portions of each composite shoe link 12, a simplified, high strength and economically manufactured track construction is realized.

Considering now the structure of the joints 13 in greater detail, with reference to FIGURE 2, a sleeve bearing 23 is disposed between the track pin 18 and each of the hinge members 17 of the shoe links 12 to reduce friction and wear. The central section of the track pin 18 fits tightly within the central hinge member 14 of the coupled shoe links 12 so that pivoting at the joint 13 results from turning of hinge members 17 relative to the track pin 18 on the bearings 23. While sleeve bearings 23 are utilized in this particular embodiment of the invention, needle bearings or other similar means may also be employed.

To retain the track pin 18 in the joint 13 and to provide for seal loading forces as will hereinafter be discussed, a fixed end cap 24 is secured to one end of the track pin. Fixed end cap 24 has a flange 26 and has a sleeve section 27 which extends coaxially within hinge member 16 to the next innermost hinge member 17. An adjustable end cap 28 is disposed coaxially on the opposite end of the track pin 18 and similarly has a sleeve section 29 extending into the opposite outer hinge member 16. The second end cap 28, which is removable to provide for assembly and disassembly of the joint 13, is held in place by a threaded bolt 31 which extends axially through the end cap and engages a threaded bore 32 in the adjacent end of the track pin 18. Both end caps 24 and 28 are restrained against rotation relative to hinge members 16 by keys 35.

As hereinbefore discussed, operation of a track chain is improved, and durability is increased, by sealing the bearing regions at each joint 13. In the track construction herein described, four seal assemblies 33 are utilized, one being situated at each end of each bearing 23. Thus one of a pair of outer seals 33′ is situated between each hinge member 17 and the adjacent end cap 24 and 28 and one of a pair of inner seals 33″ is situated between each hinge member 17 and the center hinge member 14. To provide space for the outer seals 33′, an annular recess 34 is formed in the adjacent end of each hinge member 17. To receive the inner seals 33″, similar recesses 37 are formed in the adjacent ends of hinge members 17 and the center hinge member 14.

Seals 33 are of the face type having a pair of metal seal rings 38 with abutting end faces and having a pair of loading rings 39 therefor formed of a resilient material such as rubber. While this specific type of seal is particularly well adapted for use in track chain joints, other forms of axially loaded seals may also be employed. Provided sufficient axial loading pressure is exerted against the seal assembly 33, one of the sealing rings 38 may rotate relative to the other while preventing the passage of lubricant or other materials between the region of the bearings 23 and the exterior of the track assembly 11.

To load seals of this general type an element such as the end caps 28 and 24 must exert an axial force against each seal. However in a track construction such as that described above, two of the four seals, specifically seals 33″, are virtually enclosed by other members of the track structure and thus are not readily accessible for loading in the conventional manner. Due to the difficulties associated with manufacturing parts having multiple machined surfaces to exact tolerances, and due to assembly problems, the seals 33″ cannot, as a practical matter, be maintained under the proper amount of compression by proportioning the recesses 37 for this purpose. Accordingly, other provisions for loading the seals 33 must be made in order to utilize a track construction of this type.

Considering now the means which control loading of the seals 33 in the present invention, a pair of cylindrical spacer rings 41 are disposed on track pin 18, each being concentric with one of the outer seal assemblies 33′. One of a pair of flat thrust rings 42 is also disposed in each recess 36 adjacent the inner end of the corresponding spacer ring 41 and outer seal 33′. The spacer rings 41, which have a precise predetermined axial length, limit the amount of compression of the outer seals 33′, by end caps 28 and 24, that results from tightening bolt 31 at the adjustable end cap 28. Tightening of the bolt 31 brings the sleeves 27 and 29 of the end caps into abutment with one end of the spacer rings 41. The opposite ends of the spacer rings 41 then bear against the thrust rings 42 which in turn abut the hinge members 17 thereby preventing any further axial compression of the assembly.

To avoid exerting an excessive axial force against the outer seals 33′ and spacer rings 41 by over-tightening of the end cap 28, flat annular shims 43 are disposed coaxially on the bolt 31 between the end cap and the end of track pin 18. The thickness of shims 43 needed for this purpose is determined during the initial assembly of the track joint 13 by utilizing a specialized temporary end cap 28′ shown in FIGURE 3. The joint 13 is first assembled using the temporary end cap 28′. When the end cap has been tightened, by means of bolt 31, to the point where the optimum amount of axial force is exerted against the seals 33, a micrometer reading is taken through axially directed passages 44 in the end cap 28′ to determine the shim thickness needed to reestablish this relationship when the temporary end cap 28′ has been removed and replaced with the shims 43 and permanent end cap 28 as shown in FIGURE 2.

Referring now to FIGURE 3 in conjunction with FIGURE 2, the loading force is transmitted to the inner seals 33″ by a plurality of load transfer pins 46 which extend longitudinally with the hinge members 17 between the thrust rings 42 at outer seals 33′ and a second pair of thrust rings 47 disposed coaxially in recesses 37 and bearing against each of the inner seals. To receive the load transfer pins 46, of which four are employed in this embodiment between each pair of seals 33′ and 33″, longitudinal grooves 48 are provided in the inner surface of each hinge member 17, the grooves being equiangularly spaced around the axis of track pin 18. The ends of pins 46 extend into sockets 49 on each of the associated thrust rings 42 and 47 to lock the rings against rotation relative to the hinge members 17. Thus by properly proportioning the transfer pins 46, a predetermined compressive loading force is transmitted to each of the inner seals 33″ as the bolt 31 is tightened during assembly of the joint 13 as hereinbefore described.

To retain a supply of lubricant in the joint 13, an axial bore 51 may be provided in the track pin 18. Bore 51 in this embodiment of the invention communicates with the bore 32 which receives bolt 31 and a removable threaded plug 52 is disposed therebetween. Radially directed passages 53 in the track pin 18 connect bore 51 with the recesses 37 which contain inner seals 33″ and thus communicates the lubricant supply with bearings 23, transfer pin grooves 48 and the outer seals 33′.

It will be apparent that the transfer pins for transmitting loading force to axially spaced internal seals, as well as other features of the invention, are applicable to track constructions which differ in some respects from that herein described. Many modifications are possible within the scope of the invention and it is not intended to limit the invention except as defined in the following claims.

What is claimed is:

1. In a joint for coupling component links of a track chain wherein adjacent ones of said links have interleaved hinge members and wherein a track pin is transpierced through said interleaved hinge members to couple said adjacent links and wherein at least a pair of axially spaced annular seals are disposed at said hinge members in coaxial relationship to said track pin, the combination comprising means at said joint applying an axial loading force to a first of said seals, and a plurality of rigid load transfer pins extending between said first seal and the second seal for transmitting said loading force to said second seal.

2. The combination defined in claim 1 wherein said load transfer pins extend parallel to said track pin and are spaced equiangularly therearound.

3. The combination defined in claim 1 wherein an annular thrust ring is disposed adjacent each of said first and second seals and said load transfer pins extend between said thrust rings.

4. The combination defined in claim 1 wherein said transfer pins extend through axially directed grooves in the hinge member situated between said first and second seals.

5. The combination defined in claim 1 wherein said means applying an axial loading force to said first seal comprises an end cap threadably engaged on an end of said track pin and having a sleeve portion coaxial with said track pin and abutted against a side of said first seal, and wherein said load transfer pins extend from the opposite side of said first seal to said second seal.

6. The combination defined in claim 5 wherein a thrust ring is disposed between said first seal and said load transfer pins and wherein a cylindrical spacer ring is disposed coaxially on said track pin within said first seal between said end cap and said thrust ring and defines the maximum compression of said first seal by said end cap.

7. The combination defined in claim 5 wherein said end cap is spaced from said end of said track pin when positioned to apply optimum loading force to said seals and wherein at least one shim is disposed between said end cap and the end of said track pin to define said position of said end cap.

8. A joint for coupling adjacent component links of a track chain wherein a first of said links has a central hinge member extending between spaced apart hinge members on the other of said links and wherein a track pin is transpierced through each of said hinge members to couple said links in a pivotable manner, comprising in combination, a pair of bearings each being disposed coaxially between a separate one of said spaced apart hinge members and said track pin, four annular face seals disposed in coaxial relationship to said track pin with one of said seals being at each end of each of said bearings whereby two of said seals are at the outer ends of said bearings and two are at the inner ends thereof, means fixed to a first end of said track pin and defining a first sleeve which bears against said outer seal thereat, means defining a second sleeve engaged on the opposite end of said track pin and bearing against the outer seal at said opposite end of said track pin, said second sleeve being removably engaged on said track pin at a position thereon at which said outer seals are compressed, and a plurality of load transfer pins extending parallel to said track pin within each of said spaced apart hinge members from said outer seals to said inner seals to transmit compressive force to said inner seals.

9. A joint for coupling adjacent links of a track chain as defined in claim 8 further comprising a thrust ring disposed between each of said seals and the adjacent ends of said load transfer pins, and a spacer ring disposed coaxially on said track pin within each of said outer seals and extending between said sleeve and said thrust ring thereat.

References Cited

UNITED STATES PATENTS

| 1,465,483 | 8/1923 | Rackham | 305—14 X |
| 2,853,020 | 9/1958 | Hollinger | 277—92 X |
| 3,241,843 | 3/1966 | Hatch | 277—92 |

FOREIGN PATENTS

| 559,124 | 9/1932 | Germany. |

RICHARD J. JOHNSON, *Primary Examiner.*